United States Patent Office 2,823,443
Patented Feb. 18, 1958

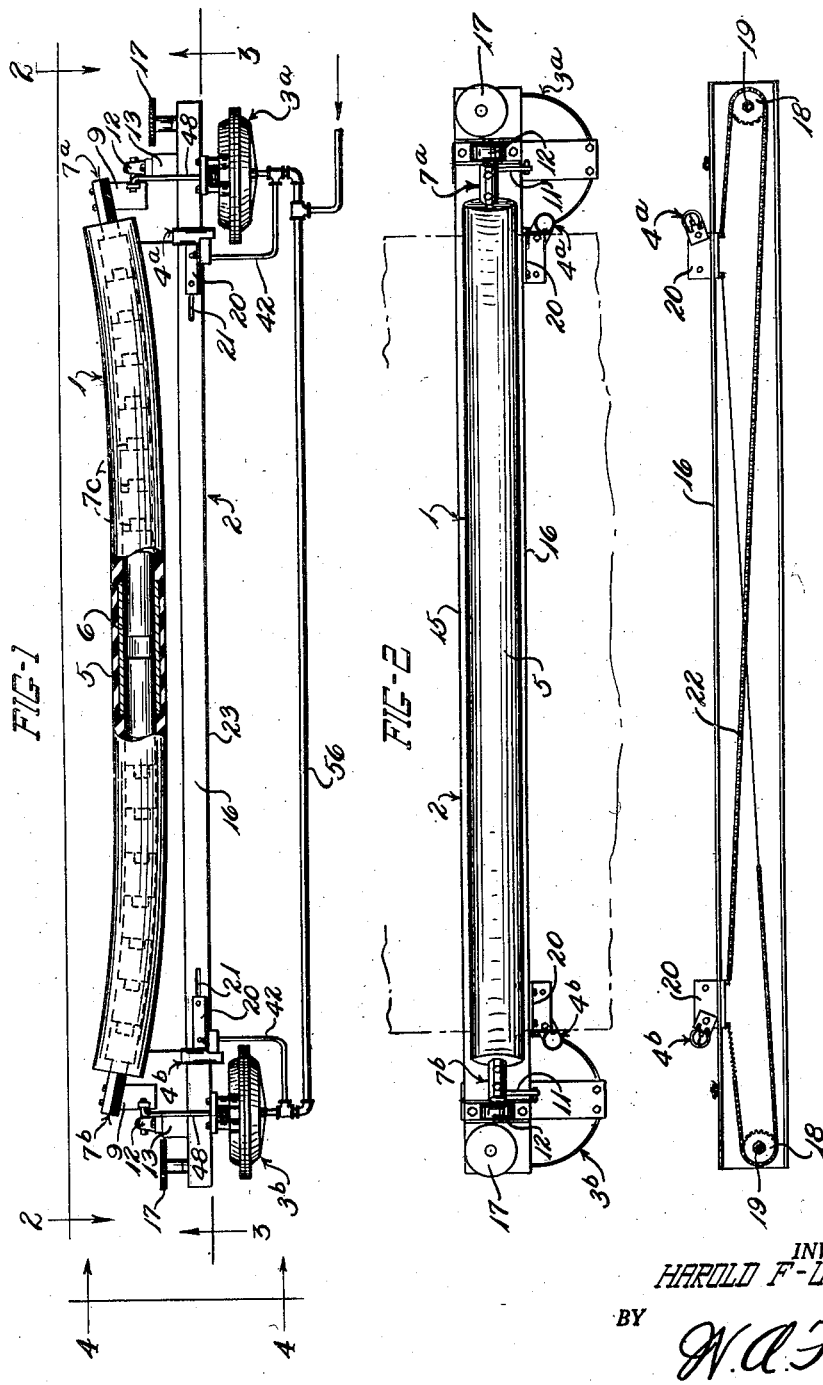

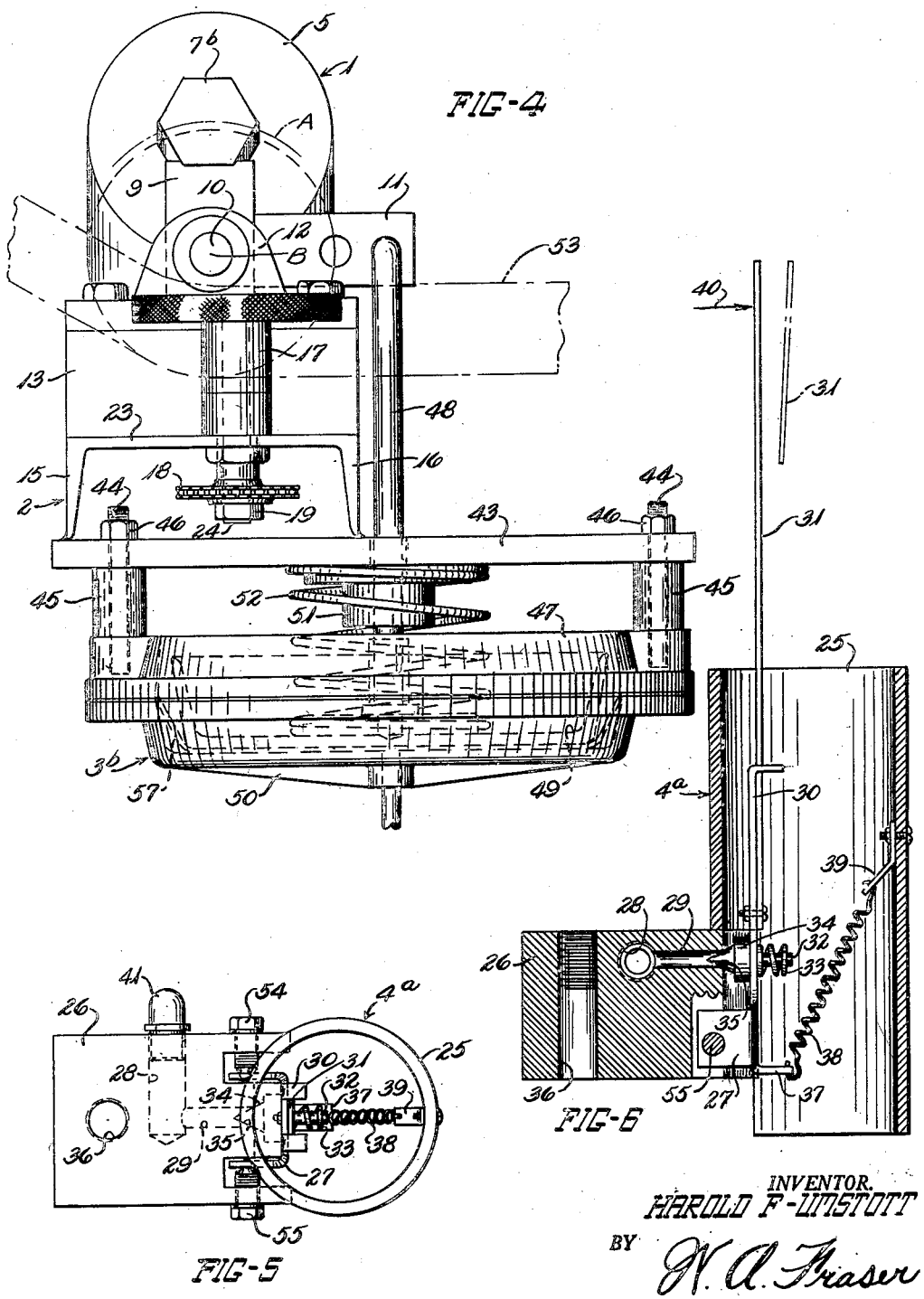

2,823,443

AUTOMATIC WIDTH CONTROLLER

Harold F. Umstott, Akron, Ohio, assignor to The Firestone Tire & Rubber Company, Akron, Ohio, a corporation of Ohio Application August 3, 1955, Serial No. 526,251

6 Claims. (Cl. 26—63)

This invention relates to apparatus for controlling the width of continuous sheet material and more particularly to apparatus for maintaining moving sheet at constant width and position by monitoring the lateral travel of each edge.

In the manufacture of many articles built up of multiple plies, continuous sheets of constantly uniform width are used. Uniform width is difficult to obtain when such continuous sheets are handled in large rolls or unwound from such rolls and led through processing machinery in preparation for building the finished multiple ply article. In passing through such processing machinery in train, tensions in the longitudinal and lateral direction together with variations of temperature and moisture as well as variations in other processing conditions, cause substantial width variations in the continuous sheet. These effects occur, for example, in the manufacture of pneumatic tires having laminated plies of rubberized fabric of uniform width. For various reasons, the known means for controlling fabric width have been unsatisfactory.

The present invention constantly controls the width of continuous sheet by monitoring means which move in response to changes in position of the respective edges of the sheet to rotate a bowed roll over which the sheet passes. Changes in curvature of the bowed roll presented to the sheet change the width and position of the sheet.

It is, therefore, an object of this invention to provide apparatus for continuously and accurately controlling the width and position of continuous sheet.

Another object is to provide apparatus for controlling the width and position of continuous fabric by the independent monitoring of each edge.

An object of the invention is to control the width and position of continuous sheet by changing the curvature presented to the sheet by a bowed roll over which it is travelling.

A further object is to provide apparatus for controlling the width and position of continuously moving fabric by manipulation of one or both of two sections of a divided axle mounting a bowed roll in response to means monitoring the edges of the travelling fabric sheet.

Yet another object of this invention is to provide a bowed roll mounted for rotation on a divided axle, the abutting ends of which are mounted for relative rotational movement.

In reference to the drawings:

Figure 1 is a front elevation partially in section of a preferred form of apparatus embodying the invention.

Figure 2 is a top plan view of the apparatus of Figure 1.

Figure 3 is a bottom view of the apparatus of Figure 1.

Figure 4 is an enlarged end elevation of the apparatus of Figure 1 as viewed from the left.

Figure 5 is an enlarged top view of the finger control valve of the apparatus.

Figure 6 is an enlarged sectional view, partly broken away, of the finger control valve of Figure 5.

Referring to Figure 1, the major assemblies of the apparatus consist of bowed roll assembly 1 attached to channel spanning assembly 2 and adapted for positional adjustment by two air motor assemblies 3a and 3b which in turn are controlled by air valve assemblies 4a and 4b.

Since axle assemblies 7a and 7b of the bowed roll assembly with their associated parts, as well as the motor assemblies 3a and 3b and air valve assemblies 4a and 4b are but mirror images of each other, only one of each will be described and like parts have like functions and like numbers.

Bowed roll assembly

Bowed roll assembly generally indicated at 1 is comprised of a rubber covered roll 5 mounted on sleeve bearing 6 rotatable on an axle. The axle consists of right and left hand sections 7a and 7b respectively, secured for relative rotational movement at their abutting ends by bearing 6. The abutting ends of the axle sections are circular in cross-section and are supported by bearing 6 which permits their relative rotation. Bearing 6 may be rigidly attached to one of the axle sections without impairing their relative rotatability.

The rubber roll 5 is rotatable about its own bowed axis by virtue of its movement with the outer races of the bearing assemblies 7c as is well-known in the bowed roll art.

Referring to Figure 4, axle 7b is a hexagonal bar bolted to upper arm 9 secured to lower arm 11 to form a bell crank arrangement pivoted on stud 10 which is journaled in bearing bracket 12 mounted on block 13. Lower arm 11 is pivotly connected to piston rod 48, a part of the air motor assembly 3a to be described.

Channel spanning assembly

The channel spanning assembly generally indicated at 2 comprises channel spanning member 23 provided with flanges 15 and 16 respectively when viewed from one end as shown in Figure 4. An annular hole in member 23 receives axle 24 mounting on one end knurled hand wheel 17 and on the other end sprocket 18 secured by nut 19. Flange 16 on the spanning member 23 is provided with slot 21, Figure 1, to receive air valve mounting block 20 which is adapted for movement in member 23 for the length of the slot 21 transverse the direction of movement of the fabric in response to the urging of chain 22. Chain 22 is secured to block 20 and passes around sprocket 18 and thence approximately the length of member 15 to the corresponding valve mounting block on the other end of the channel spanning assembly as shown in Figure 3. It will be seen that manipulation of handwheel 17 will position block 20 in slot 21. By turning either handwheel, it is possible to move the blocks toward each other or apart as desired thereby setting a predetermined width for the fabric passing over bowed roller 5. Block 20 mounts the air valve assembly 4a which monitors the edge of the fabric for fine adjustment to maintain the fabric width at the predetermined setting.

Air valve assembly

Referring to Figures 5 and 6, it will be seen that air valve assembly generally indicated at 4a is comprised of cylinder 25 receiving one end of valve block 26 through the wall thereof. Valve block 26 is provided with two recesses adjacent the cylinder 25 to receive yoke 27 while two annular passages 28 and 29 meet at right angles within said block to provide bleeder passages for the air line to be described hereinafter. Block 26 is also provided with drilled and tapped hole 36 to receive a bolt not shown for holding the valve block 26 to the air valve block 20. Block 26 is drilled and tapped to receive pivot bolts 54 and 55 for pivoting yoke 27.

Yoke 27 is integral with arm 30 to which is attached finger 31 providing for monitoring of one selvage edge of the passing fabric. Arm 30 mounts valve 32 and spring 33 adapted for loosely positioning valve 34 in seat 35 in passage 29. Yoke 27 is provided with a second depending arm 37 attached to one end of return spring 38 secured to the inner wall of cylinder 25 at its other end by hook 39.

Increases in fabric width exert pressure against the end of finger 31 in the direction indicated by arrow 40 to pivot yoke 27 about pivot bolts 54 and 55 tensioning return spring 38 and lifting valve 34 from valve seat 35 to allow air to bleed from annular passages 28 and 29. Decreases in fabric width relieve pressure from finger 31 to allow return spring 38 to pivot yoke 27 to the return position thereby repositioning valve 34 in seat 35 to prevent the bleeding of air from the system. Even slight variations in fabric width influence the pressure against the end of finger 31 to regulate the amount of air pressure in the system. Since air valve assembly 4a just described is connected to the air motor assembly generally indicated at 3a by fitting 41 and associated flexible conduit 42 (Fig. 1) said air motor is accurately and quickly controlled by pressure against finger 31.

*Air motor assembly*

The air motor assembly (Fig. 4) is comprised of mounting plate 43 secured to channel spanning member 23, one motor at each end of the spanning member. Referring to Figure 4, studs 44 pass through spacers 45 and plate 43 and are threaded to receive nuts 46 which secure flanged base ring 47 to mounting plate 43. Base ring 47 and mounting plate 43 are provided with annular openings for the reception of piston rod 48 which is pivotally attached to arm 11 at one end as has been described and secured at the other end to piston 49, said piston being enclosed by base ring 47 and cover plate 50, and capped by diaphragm 57 shown by dotted lines in Figure 4. Piston rod 48 is centered over the annular opening in the mounting plate 43 by washer 51. Return spring 52 abuts the mounting plate 43 and piston 49 to resist movement of the piston 49 toward said plate and to return said piston to a predetermined position when no air is entering the motor from air valve assembly 4a through flexible conduit 42.

Increased air pressure from the air valve assembly 4a against the diaphragm 57 forces piston rod 48 against the arm 11 of the bell crank which pivots about stud 10 forcing upper arm 9 to swing axle 7a relative to axle 7b thereby rotating one half of the bowed roll to present a different curvature to the passing fabric. Adjusting the curvature of the bowed roll narrows or widens the strip as necessary.

For efficient operation of the invention, a metering orifice may be installed between the air supply source and the air motor. Such an orifice may be fixed in size and as conventionally employed comprises a plug with a center drilled hole 0.35 inch in diameter installed in conduit 56.

In the operation of the invention, monitoring fingers 31 are set to define the desired width of a continuous sheet by turning handwheel 17 to rotate sprocket 18. This action actuates chain 22 to move air valve mounting blocks 20 and the air valve assemblies 4a, 4b to predetermined positions so that monitoring fingers 31 define the desired width of the passing sheet 53.

The sheet 53 traveling over roll 5, assumes a width determined by the curvature of roll 5 presented to the approaching sheet and as the sheet widens for any reason, the edges move laterally outward toward the respective ends of the roll. As these edges press against monitoring fingers 31, yoke 27 is pivoted about pivot bolts 54 and 55 thereby tensioning return spring 38 and lifting valve 34 from valve seat 35 to bleed air from the air motor assembly 3a, through conduit 42.

Reduction of air pressure against the diaphragm 57 allows spring 52 to force piston rod 48 away from arm 11, to pivot the bell crank and axle 7a. This movement changes the curvature presented by the roll 5 to the passing fabric sheet and thereby controls the width of the fabric.

As long as the air pressure against diaphragm 57 remains constant, piston rod 48 will hold lower arm 11, upper arm 9 and axle 7a in a fixed position. However, when bleeder valve 34 is opened by the contact of the edge of material 53 against monitoring finger 31, air pressure against the diaphragm is reduced and return spring 52 moves the diaphragm and piston toward cover plate 50. This action draws piston rod 48 in the same direction to pivot the bell crank arrangement comprised of arms 11 and 9 about stud 10, rotate axle 7a and change the curvature of the roll 5.

Pivoting the bell crank results in a twisting action on the axle but since in the preferred form of the invention, the axle is divided into two lengths 7a and 7b abutting in bearing 6 only one half of the axle will swing thereby rotating and changing the curvature on only one side of the bowed roll 5.

It will be seen that the movement of one side of bowed roll 5 presents a curvature of different degree to the passing fabric on that side than is presented by the other side of the bowed roll. This allows either side of the passing strip to move in or out as either end of the bowed roll presents a curvature of varying degrees of convexity and concavity.

Rubber roll 5 moves in conjunction with the movement of the respective axle sections. Consequently, moving one bell crank about its pivot results in a change in the curvature of the respective portion of roll 5.

The effect upon the sheet of the rotation of roll 5 about its axis is to carry increments of the sheet in directions normal to the curvature presented. Thus, a convexity has a convergent effect upon the increments causing the sheet to shrink, and, conversely, a concavity has a divergent effect causing the sheet to stretch.

While the preferred embodiment of the invention has been described in relation to continuous fabric sheet, it should be observed that the invention may be used on plastic sheet which, particularly when warm, will stretch and widen when passed over a bowed roll. Although a pneumatic pressure system has been described for positioning the bowed roll, it is possible to use a hydraulic pressure system by providing conduit for recirculation of fluid bled from the bleeder valve back into the hydraulic system. Such a modification is within the scope of the invention.

Couplings or connectors such as ball bearing, roller bearings and the like may be used to mount the abutting ends of the axle sections for relative rotational movement.

Various other modifications will be apparent to those skilled in the art without departing from the scope of the invention as claimed.

What is claimed is:

1. Apparatus for controlling the width and position of continuous sheet passing therethrough comprising a bowed roll supported by an axle divided into two sections mounted transverse the direction of travel of and over which said sheet passes, the abutting ends of said sections connected by a bearing and adapted to permit independent arcuate movement of the outer ends of said sections, bell cranks each having one arm attached to the outer end of each respective section and pivoted to permit the arcuate movement of the outer end of each respective section whereby the curvature presented by each section of the bowed roll to the passing sheet is changed, fluid pressure motors mounted adjacent each said bell crank attached to the second arm thereof and adapted to pivot respectively each said crank, a fluid pressure system including two bleeder valve assemblies connected to said motors and adapted to feed fluid pressure thereto, guide fingers resiliently contacting the edges of and responsive to changes in the width of said sheet material, valves mounted on the base of said fingers and normally seated in respective valve seats in said bleeder valve assemblies and responsive to the movement of each said fingers whereby changes in width of said material move said fingers to regulate said bleeder valves actuating the motors to turn the bell cranks and change the curvatures presented by the bowed roll sections to the passing sheet material.

2. Apparatus for controlling the width and position of continuous sheet passing therethrough, comprising a bowed roll presenting a curved surface to one face of said sheet and supported by an axle having two sections, means connecting the abutting ends of each section of said axle and adapted to permit independent arcuate movement of the outer end of each section, bell cranks having one arm attached to the outer end of each section and adapted to move the outer ends of the respective sections about a pivot, guide means monitoring each respective edge of said sheet and adapted to move in response to changes in width of said sheet, fluid pressure motors attached to the outer arm of each said bell cranks and adapted to pivot said bell cranks to thereby rotate the respective sections of said axle to rotate respective sides of said bowed roll, a fluid pressure system connected to each motor, and a valve in said system responsive to the movement of said guide means and adapted to vary the fluid pressure in said motor in response to changes in width of said sheet to thereby swing the axle sections and change the curvature said bowed roll presents to the surface of said sheet.

3. Apparatus for controlling the width and position of a continuous, moving sheet comprising a bowed member over which said sheet passes, said member supported by an axle divided transversely into two sections, the abutting ends of said sections relatively rotatable about a common axis to permit arcuate movement of the outer ends of said sections, means adapted to sense the position of each edge of said sheet, means adapted to move said outer ends in arcuate paths, each said moving means responsive to each said sensing means respectively, whereby said sheet maintains across its width a direction of travel over said member normal to the axis of said member to maintain a predetermined width and position.

4. Apparatus for controlling the width and position of a continuous, moving sheet comprising a rotatable bowed roll over which said sheet passes, said roll supported by an axle divided transversely into two sections, the abutting ends of said sections relatively rotatable about a common axis to permit arcuate movement of the outer ends of said sections, pneumatic means adapted to sense the position of each edge of said sheet, a bell crank connected to each outer end and adapted to move said end in an arcuate path, each said bell crank respectively responsive to said pneumatic means, whereby said sheet maintains across its width a direction of travel over said roll normal to the axis of said roll to maintain a predetermined width and position.

5. Apparatus for controlling the width and position of a continuous, moving sheet comprising a flexible bowed member over which said sheet passes, said member supported by an axle divided transversely into two sections, the abutting ends of said sections relatively rotatable about a common axis to permit arcuate movement of the outer ends of said sections, means adapted to sense the position of each edge of said sheet, means adapted to move said outer ends in arcuate paths, each said moving means responsive to each said sensing means respectively, whereby said sheet maintains across its width a direction of travel over said member normal to the axis of said member to maintain a predetermined width and position.

6. Apparatus for controlling the width and position of a continuous, moving sheet comprising a bowed roll over which said sheet passes, said roll supported by a bowed axle divided transversely into two sections, the abutting ends of said sections relatively rotatable about a common axis, said axle adapted to permit arcuate movement of the outer ends of said sections, means adapted to sense the position of each edge of said sheet, means adapted to move said outer ends in arcuate paths, each said moving means responsive to each said sensing means respectively, whereby said sheet maintains across its width a direction of travel over said roll normal to the axis of said roll to maintain a predetermined width and position.

References Cited in the file of this patent

UNITED STATES PATENTS

| | | |
|---|---|---|
| 2,064,993 | Sperry | Dec. 22, 1936 |
| 2,476,070 | Solliday | July 12, 1949 |
| 2,492,737 | Dunn | Dec. 27, 1949 |
| 2,496,312 | Robertson | Feb. 7, 1950 |
| 2,547,975 | Robertson | Apr. 10, 1951 |
| 2,638,656 | Tuttle et al. | May 19, 1953 |